March 16, 1954     R. W. JENSEN     2,672,086
SAFETY VALVE

Filed Aug. 3, 1950     4 Sheets-Sheet 1

RAYMOND W. JENSEN,
INVENTOR.

BY
ATTORNEY

March 16, 1954  R. W. JENSEN  2,672,086
SAFETY VALVE
Filed Aug. 3, 1950  4 Sheets-Sheet 2
Fig. 3.
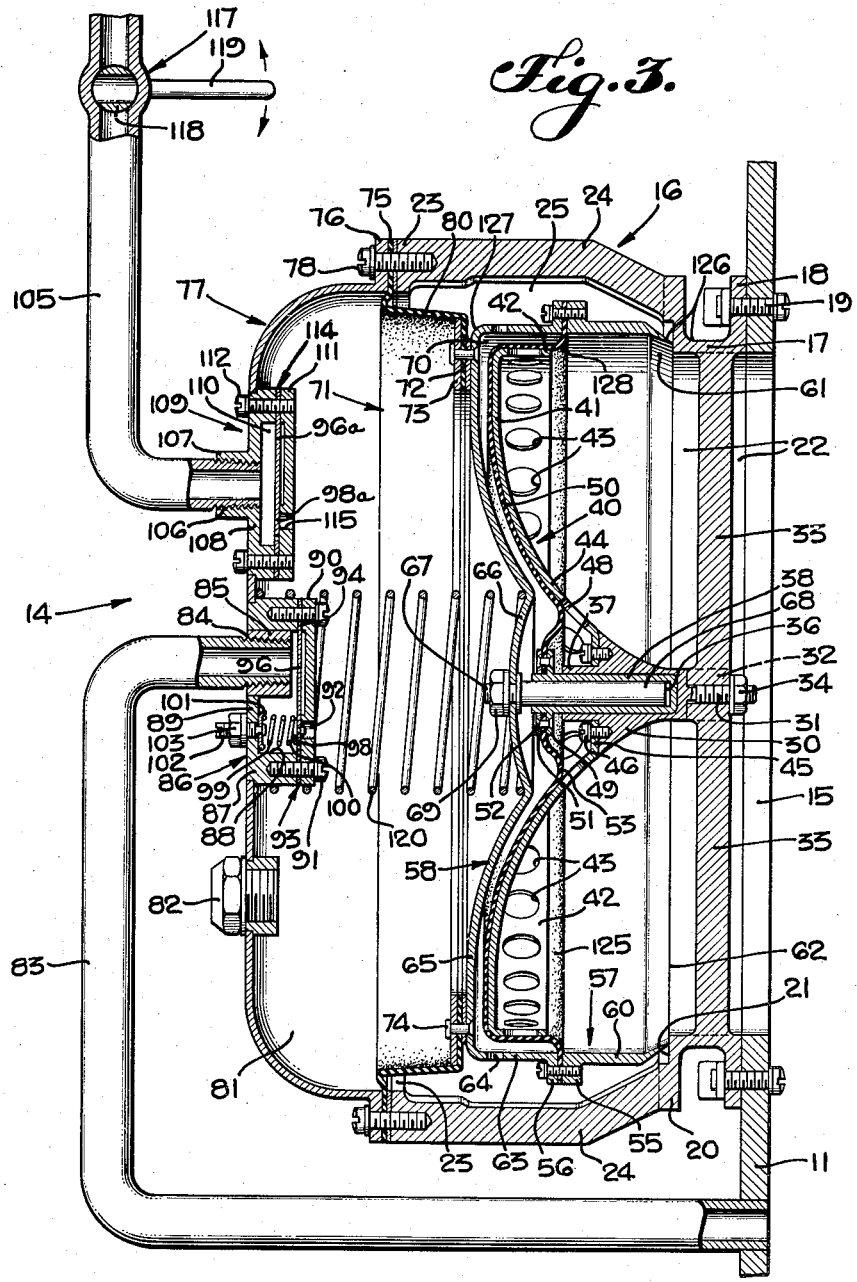
RAYMOND W. JENSEN,
INVENTOR.
BY 
ATTORNEY March 16, 1954  R. W. JENSEN  2,672,086
SAFETY VALVE Filed Aug. 3, 1950  4 Sheets-Sheet 4

RAYMOND W. JENSEN,
INVENTOR.

BY
ATTORNEY

Patented Mar. 16, 1954

2,672,086

UNITED STATES PATENT OFFICE 2,672,086

SAFETY VALVE

Raymond W. Jensen, Los Angeles, Calif., assignor to The Garrett Corporation, Los Angeles, Calif., a corporation of California Application August 3, 1950, Serial No. 177,416

25 Claims. (Cl. 98—1.5)

This invention relates generally to pressure control mechanisms, and relates more particularly to mechanisms for controlling the pressure within an enclosure.

While the invention has particular utility in connection with pressurized ventilation of aircraft cabins and the like, and is shown and described herein as embodied in such a conditioning system, it is to be understood that its utility is not limited thereto.

In the pressurization of aircraft cabins for flight at altitudes above sea level it is customary to provide a blower or supercharger whereby air for ventilation purposes is taken from the ambient atmosphere, is compressed by the supercharger, and is then delivered to the cabin. In order to regulate the pressure of such ventilation air within the cabin, it is customary to provide an outflow valve or cabin pressure regulator which will maintain cabin pressure on a predetermined schedule. In addition to the regulator it is customary to install other valves which will provide escape of cabin air to atmosphere or entrance of atmospheric air to the cabin under certain conditions.

In high altitude aircraft certain problems are encountered in the control of the pressure in the cabins thereof. For example, if a malfunction occurs in the regulator at extreme altitudes, it is desirable to have a positive pressure relief for venting excess cabin air to the atmosphere when the differential between cabin and atmospheric pressures approaches the safe structural limit of the cabin, in order that this safe differential will not be exceeded. Furthermore, a surge may occur in cabin pressure which the regulator is incapable of immediate relief even though operating satisfactorily otherwise. In such a case, it is desirable for the auxiliary pressure relief valve to vent the cabin pressure surge air to atmosphere.

In another condition, if atmospheric pressure exceeds cabin pressure at any time, it is generally desirable to provide a valve which will allow ambient atmospheric air to enter the cabin and thus nullify the negative pressure or so-called "vacuum" differential. Such a condition might be encountered if the aircraft were to go into a steep dive and the regulator were incapable of reversed air flow.

In still another condition, it is frequently desirable that equalization between cabin and atmospheric pressures be accomplished quickly. Such a condition might occur in a pressurized military aircraft entering a zone of combat, or when an aircraft of any type having its cabin pressurized is preparing to land.

The valve of the present invention accomplishes the three relief functions described above in a novel manner, and it is, therefore, an object of the present invention to provide a valve which combines in one structure the function of positive pressure relief, negative pressure relief, and manually selective dump.

It is still another object of the present invention to provide a valve mechanism of this character which is pneumatic in character.

A further object is to provide a valve of this type which is operable automatically in its pressure relief functions.

It is a still further object of the invention to provide a valve of this type which may be mounted on the inside of the pressurized enclosure.

Another object of the invention is to provide such a valve as a unitary, compact item, simple in operation and maintenance, and capable of being produced at relatively low cost.

Still another object of the invention is to provide a device of this character, wherein the response is very rapid, and which has improved operating characteristics.

Other objects and advantages of the invention will be brought out in the following part of the specification.

Referring to the drawings, which are for illustrative purposes only,

Fig. 3 is an enlarged sectional view taken on line 3—3 of Fig. 2 showing the valve closed;

Figure 1:
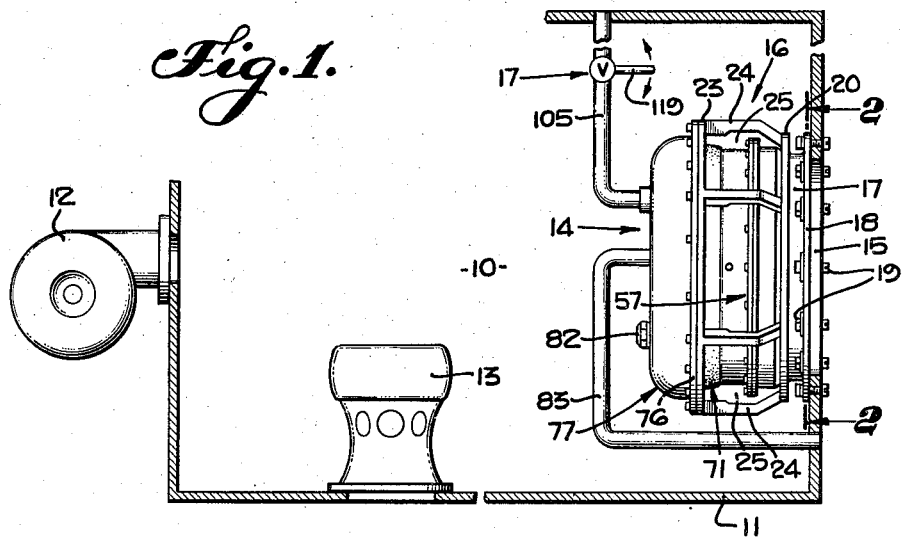
Fig. 1 is a diagrammatic view of a control system having a pressure control mechanism embodying the present invention.

Referring to Fig. 1, there is shown an enclosure 10, such as an aircraft cabin, defined by walls 11, said enclosure being supplied with compressed air by a blower or supercharger 12, an outflow from said enclosure being controlled by a pressure regulator 13.

A relief valve, indicated generally at 14, which embodies the present invention, is shown as mounted inside the enclosure for controlling a port 15 in one of the walls 11 of said enclosure.

Figure 2:
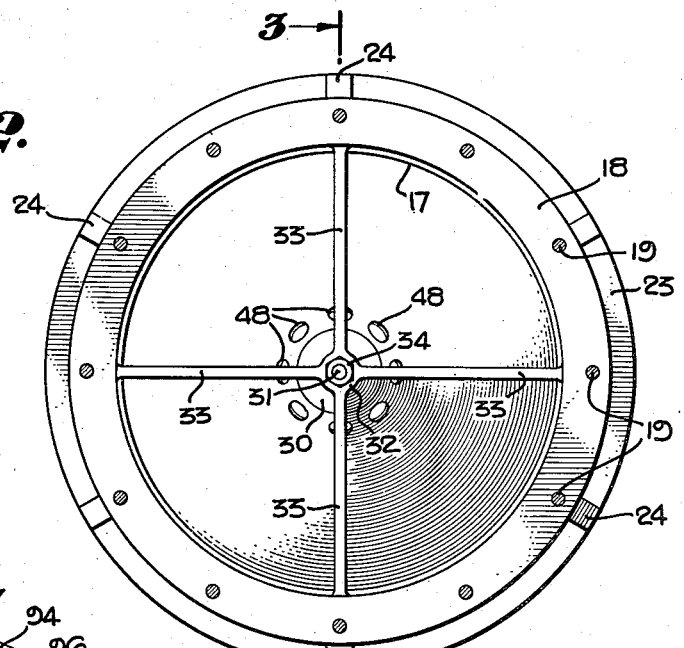
Fig. 2 is an enlarged view taken on line 2—2 of Fig. 1.

Referring to Figs. 1, 2 and 3, the relief valve mechanism 14 comprises a base or body assembly, indicated generally at 16, which has a base 17 provided with a radially extending annular flange 18 for attachment to the cabin wall by screws 19 or by any other suitable means. Included in the base 17 is an annular member 20 having an interior recess, the bottom 21 of which provides a valve seat about an outlet opening 22 in the base. The base assembly also includes an outwardly extending flange 23 spaced axially from the base 17 and connected thereto by annularly spaced struts 24, between which are openings 25 in the base assembly for the passage of air therethrough which may then communicate with the outlet opening 22 in the base assembly when the valve is open, as will be more particularly described hereinafter.

Within the base assembly 16 is a coaxial pedestal 30, of generally frusto-conical shape, from the smaller end of which axially extends a threaded projection 31 received in an opening provided therefor in a boss 32 arranged axially of the base assembly and supported by radially extending, annularly spaced webs 33 shown as being formed integrally with the base 17. A nut 34 on the projection 31 secures the pedestal to said boss.

The pedestal 30 is provided with an axial bore 36 which extends from a member 37 projecting axially from the larger end thereof, and within said bore is secured a tubular insert 38, closed at its inner end.

Attached to the larger end of the pedestal 30 is a baffle, indicated generally at 40, said baffle having a peripheral portion 41 substantially parallel with the base from the outer edge of which a generally cylindrical flange 42 extends toward said base, said flange being provided with a plurality of annularly spaced openings 43. The central portion 44 of the baffle 40 is generally frusto-conical in shape, curving inwardly toward the base and provided with a flange 45 extending inwardly and surrounding an axial opening in which is received the tubular extension 37, said baffle being secured to the larger end of the pedestal by screws 46 received in openings provided therefor in the flange 45 and threaded openings in the pedestal. Adjacent the flange 45 are a plurality of annularly spaced openings 48 in the frusto-conical portion of the baffle.

The end of the insert 38 which projects outwardly relative to the tubular member 37, is provided with an exterior flange 49 which serves as one side of clamping means for securing a central area of a diaphragm 50 which may also be termed a flexible member. The diaphragm 50 is provided with an axial opening for reception of the outer end of the insert 38, and the above referred to central portion of the diaphragm is clamped between said flange 49 and an annular plate 51, the parts being secured together by rivets 52.

Adjacent the clamped portion the diaphragm is convoluted as at 53, and the major portion of said diaphragm overlies the inner surface of the baffle, including the flange 42. The diaphragm 50 is marginally clamped between outwardly extending flanges 55 and 56 of a movable outflow valve member, indicated generally at 57, and a valve cover, indicated generally at 58, said valve member and valve cover comprising the outflow valve assembly.

The valve member 57 comprises a cylindrical portion 60 with the flange 55 at one end and a frusto-conical end portion 61 at the opposite end having a sharpened valve edge 62 adapted to engage the valve seat 21.

The valve cover 58 comprises a cylindrical portion 63 which has the flange 56 at one end with a plurality of annularly spaced openings 64 therein. The other end of the cylindrical portion 63 is closed by an end wall or bottom 65 having the general configuration of the baffle 40 between the periphery and a central portion 66 which is curved outwardly relative to the interior of the cover 58. The central portion 66 has an axial opening therein for reception of the threaded end 67 of a shaft 68 which is slidable in the insert 38. A nut 69 secures the shaft and cover together. The cover is of sufficient size so as to have its bottom and cylindrical portion 63 spaced from the adjacent portions of the baffle 40 to thereby provide a chamber 70 therebetween.

There is a second diaphragm or flexible member, indicated generally at 71, which is annular in shape, and includes an internal portion 72 clamped between a peripheral area of the valve cover 58 and a ring 73, the parts being secured together by rivets 74 or any other suitable means. A peripheral area 75 of the diaphragm 71 is clamped between the flange 23 of the base assembly and an outwardly extending flange 76 of a cup-shaped head, indicated generally at 77, the parts being secured together by screws 78. The space between the valve assembly and the base assembly is spanned by a convoluted portion 80 of the diaphragm 71, said diaphragm 71, valve cover 58, and head 77 defining a pressure chamber 81.

Figure 6:
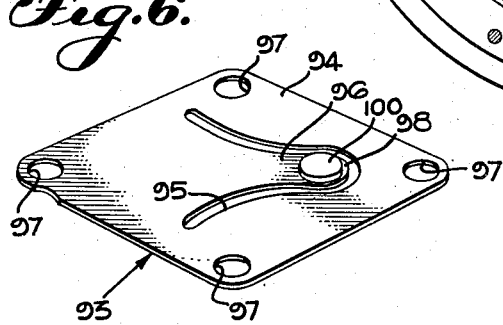
Fig. 6 is a perspective view of a reed valve used in the present device.

The chamber 81 has a connection with a source of higher pressure, such as the cabin, said connection comprising a calibrated restricted orifice 82 for bleeding air into said chamber 81. The chamber also has a pair of connections with a region of lower pressure, such as true static or atmospheric pressure, one of said connections including a conduit 83. One end of the conduit 83 is externally threaded at 84 and is screwed into a boss 85 of a check valve assembly, indicated generally at 86. The boss 85 is welded, or otherwise suitably secured in a valve body 87, which in turn is welded or otherwise suitably secured in an opening provided therefor in the head 77. The valve body 87 is provided with an internal recess 88 closed at its outer side by a wall 89 and provided with a cover 90 at its inner side, secured to the body by screws 91 or the like. The cover has an opening 92 therein for the passage of air from the chamber 81 to atmosphere by way of the conduit 83, the opening 92 being controlled by a check valve, indicated generally at 93, and best shown in Fig. 6.

The check valve 93 comprises a plate 94 having a hairpin-like slot 95 cut therein to provide a flexible tongue 96 comprising a movable valve member. The plate has a plurality of openings 97 for reception of the screws 91, so that said plate may be clamped between the cover 90 and the valve body 87. When thus clamped in position, the free end 98 of the tongue 96 controls the opening 92 and is urged in the closing direction by a light spring 99 having its ends held in position by a spring retainer 100 at the end 98, and a spring retainer 101 adjacent the outer wall of the valve body 86. The spring retainer 101 is connected with an adjustment screw 102 which is locked in adjusted positions by a nut 103.

The other connection between the chamber 81 and atmosphere includes a conduit 105 having a threaded end 106 screwed into a boss 107 of a valve body 108 forming part of a check valve, indicated generally at 109. The body 108 has an internal recess 110 therein, and a cover 111 secured to the body 108 by screws 112, said valve body 108 being suitably secured to the head 77 by welding or any other suitable means.

Clamped between the cover 111 and the valve body 108 is a check valve, indicated generally at 114. This check valve is constructed similarly to the valve shown in Fig. 6 but does not include the spring retainer 100. The free end 98a of the tongue 96a controls a passage 115 in the cover.

Interposed in the conduit 105 is a manually operated valve, indicated generally at 117 and including a movable valve part 118, operable by a handle 119.

The outflow valve assembly is urged in the closing direction by a light spring 120 having one end received in a groove formed at the junction of the part 66 of the valve cover 58 and the part 65 of said valve cover at the closed end wall of the head 77. The opposite end portion of the spring 120 is disposed about the valve body 87 which retains said end of the spring in position.

Air pressure within the chamber 81 may be termed a control pressure, and said pressure, together with the pressure of the spring 120 acting on the valve cover 58, urges the valve assembly (which may be termed a pressure responsive means) in a direction tending to close the valve 57, the spring 120 normally maintaining said valve member 57 in the closed position inasmuch as the valve assembly is otherwise normally balanced as to both cabin pressure and atmospheric pressure.

Under normal conditions chamber 81 is at cabin pressure due to the bleed of cabin air thereinto through the restricted bleed 82, and this pressure is effective on one side of the diaphragm 71 and valve cover 58 urging the valve member 57 in the closing direction, said valve member at the same time being urged in the opening direction by cabin pressure acting on the opposite side of diaphragm 71 and the cover 58, said cabin pressure being present in the chamber 70, between said cover 58 and diaphragm 50, when the latter is in the normal position as shown in Fig. 3, due to the communication of cabin pressure to said chamber 70 through the openings 64 in the cylindrical portion 63 of said cover 58.

It will also be noted that the outer side 126 of the frusto-conical part 61 of the valve member 57 is also exposed to cabin pressure urging the valve assembly in the valve opening direction, and there is an area 127 of the cover 58 against which cabin pressure is exerted urging the valve assembly in the valve closing direction. The respective areas on opposite sides of the diaphragm 71 and cover 58 and the areas 126 and 127 of the valve assembly subjected to cabin pressure urging the valve assembly in opposite directions, are substantially equal, so that said valve assembly is substantially balanced with respect to cabin pressure under the conditions above described.

As cabin pressure is higher than atmospheric pressure under normal conditions, the diaphragm 50 is pressed against the adjacent side of the baffle 40, as shown in Fig. 3. The baffle may be termed a wall and the diaphragm 50 may be considered a movable barrier which moves from one position to another position, hereinafter described, in accordance with certain pressure conditions on opposite sides thereof.

Portions of the diaphragm 50 are exposed to atmospheric pressure through the openings 43 as atmospheric pressure is present in the pocket defined by the valve member 57 and diaphragm 50, which pocket is in communication with atmosphere through the outlet opening 22. Also exposed to atmospheric pressure is the outer side of the convoluted part 128 of the diaphragm 50, said convoluted part spanning the space between the valve member 57 and the adjacent part of the baffle 40.

The pressure of the atmospheric air or fluid against the outer side of the convolution 128 exerts a force transferred by the outer portion of the convolution to the valve assembly or pressure responsive means tending to move the same in a direction to open the valve. The frusto-conical portion 61 of the valve member 57, being of smaller diameter at its end nearest the valve seat 21, provides an area or shoulder on the inner side thereof, against which atmospheric pressure in the pocket is exerted in a direction tending to close the valve, and as these areas which are exposed to atmospheric pressure are substantially equal, the valve assembly or pressure responsive means is balanced with respect to atmospheric pressure so that the valve will not be moved thereby toward open or closed position.

Positive pressure relief

Normally the dump valve 117 is closed, and under such conditions the mechanism operates to provide positive pressure relief whenever atmospheric pressure on the left side, as shown in Fig. 3, of the valve 86, decreases so that the differential between atmospheric pressure and the chamber 81 causes said valve 86 to open and vent chamber 81 to atmosphere. The valve 86 is so calibrated as to thus open when there is a predetermined differential between the pressure in the chamber 81 and atmosphere.

As an example, a valve of this type will be assumed to be installed in an aircraft whose pressure regulator is set for differential operation at 2.75 p. s. i. It is further assumed that the aircraft cabin will be unpressurized up to an altitude of 10,000 feet where the ambient atmospheric pressure is about 10.1 p. s. i. From these assumptions it is seen that the pressure regulator will enter into differential operation at 7.35 p. s. i. ambient atmospheric pressure which is at an altitude of approximately 18,000 feet. A further assumption is made that the pilot valve 86 is calibrated to open at 3.0 p. s. i. differential. Suppose that the aircraft has flown to an altitude of 30,000 feet (ambient pressure 4.36 p. s. i.) in which case the regulator has established a virtual cabin altitude of about 18,800 feet, and at that time a malfunction of the regulator occurs so as to shut off the outflow of ventilation air. Cabin pressure will then rise until the differential between cabin and atmosphere becomes 3 p. s. i. (a virtual cabin altitude of approximately 18,000 feet) at which point the relief valve will take over control of cabin pressure.

Figure 5:
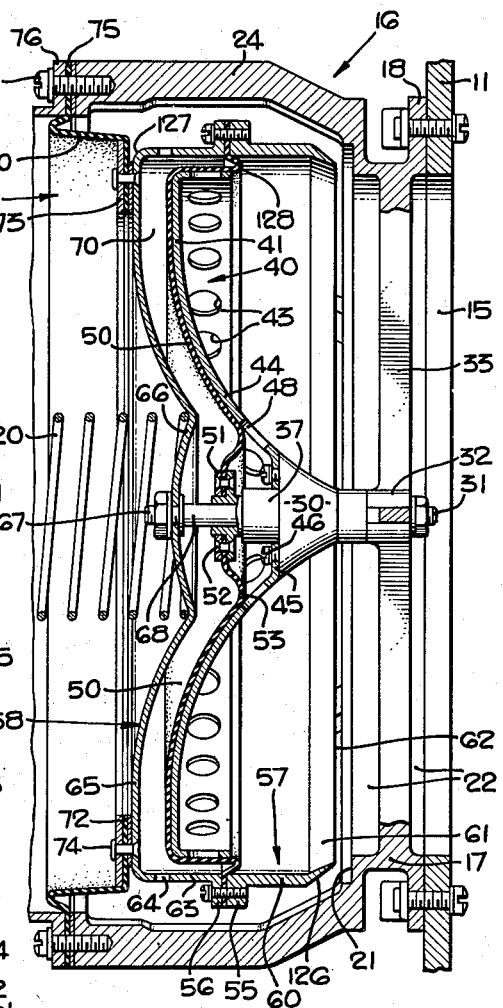
Fig. 5 is a view similar to Figs. 3 and 4 showing the valve open for positive pressure relief.

Up to the point of regulator malfunction, i. e., normal flight schedule when the differential between cabin and atmospheric pressures is not greater than that for which the valve is calibrated to open, the pressure in the chamber 81 is equal to cabin pressure by virtue of the constant communication therebetween through the restricted orifice 82. When the differential between the pressures in the chamber 81 and atmosphere exceeds the force equivalent to 3.0 p. s. i. for which the pilot valve 86 is calibrated, the valve member 98 is unseated, allowing chamber air to escape to atmosphere at a greater rate than air can enter the chamber from the cabin through the restricted orifice 82. As a result, the pressure in the chamber 81 drops until cabin pressure in the chamber 70, exerted against the diaphragm 71 and bottom wall of the cover 58, is sufficient to overcome the combined force of spring 120 and the effective pressure in the chamber 81 against said diaphragm 71 and bottom wall of the cover 58. The result is a leftward movement of the outflow valve assembly, as viewed in Figs. 3 and 5, thereby moving the valve member 57 from its seat 21 and venting the cabin to atmosphere, the parts then being as shown in Fig. 5. It will be noted in this connection that the cabin pressure prevailing in the chamber 70 maintains the diaphragm 50 in contact with the adjacent side of the baffle 40.

When the differential between cabin pressure and atmosphere drops below 3.0 p. s. i., the pilot valve 86 closes, thereby preventing further escape of air from the chamber 81 to atmosphere so that the pressure in said chamber 81 is built up until it reaches cabin pressure, due to the bleeding of cabin air into said chamber through the bleed 82. Chamber air pressure and cabin pressure being equalized, the spring 120 moves the outflow valve assembly rightwardly until the knife edge 62 of the valve member 57 engages the seat 21 and stops the escape of air from the cabin to atmosphere through the relief valve.

Negative pressure relief

Should atmospheric pressure exceed cabin pressure, the present device will provide negative or vacuum relief.

Figure 4:
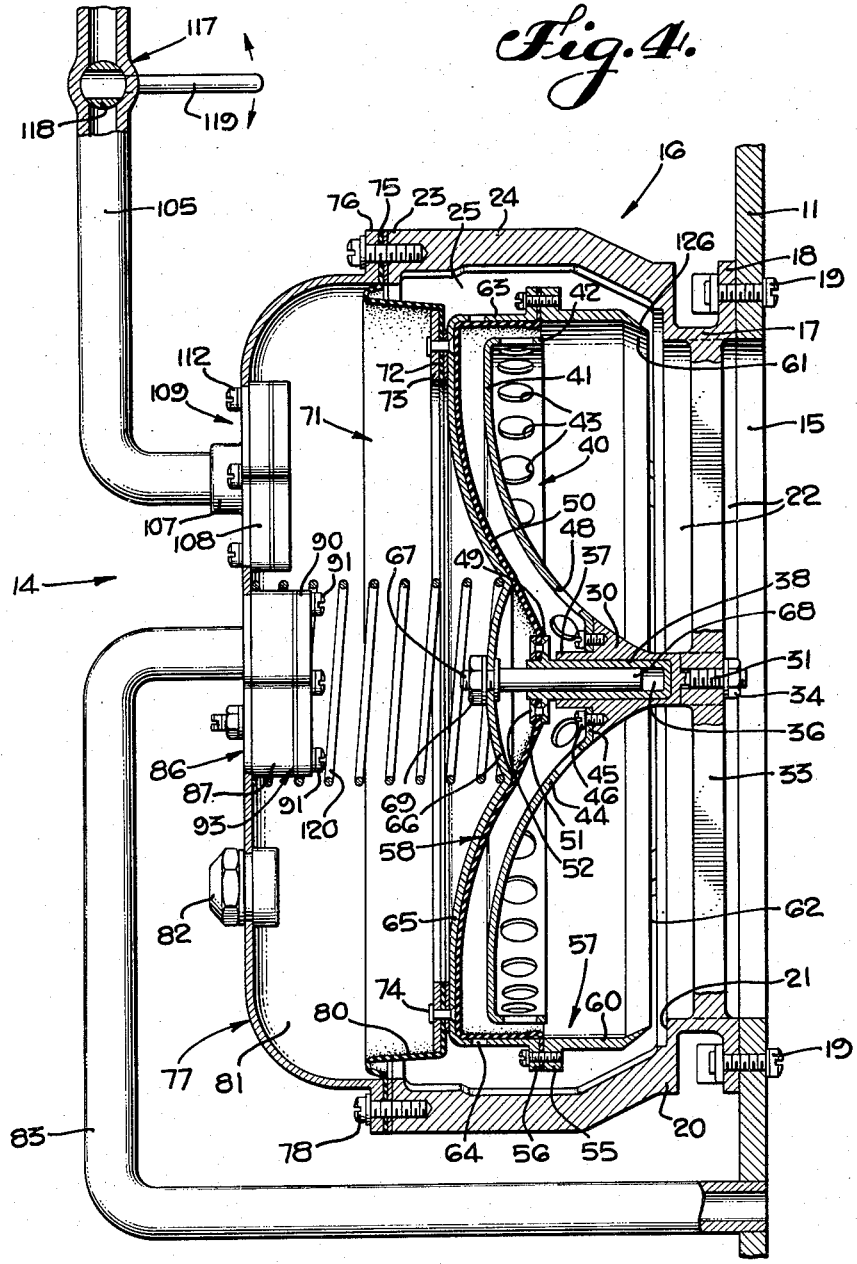
Fig. 4 is a view similar to Fig. 3, showing the valve open for negative pressure relief.

Under such conditions therefore (when atmospheric pressure exceeds cabin pressure, and hence, the pressure in chamber 81), the differential between these pressures is applied to the diaphragm 50, causing said diaphragm to move to the left, as viewed in Figs. 3 and 4, causing said diaphragm to move to the position shown in Fig. 4, whereat said diaphragm engages the cylindrical part 63 of the cover and the bottom wall thereof. Thereupon, atmospheric pressure, which is transmitted to the diaphragm 50 through the openings 43 and the space between the baffle 40 and diaphragm 50, is applied effectively over substantially the whole area of the diaphragm 50. This pressure is then applied to the cover 58 so as to effect leftward movement of the outflow valve assembly, thereby moving the valve member 57 off of its seat and admitting atmospheric air into the cabin.

It is to be understood, of course, that the atmospheric pressure, in order to effect opening of the valve, must increase a sufficient amount above cabin pressure so as to overcome the force of the spring 120, said spring however, being relatively light.

When the differential of pressure between that in the cabin and atmosphere is such that cabin pressure is substantially the same as atmospheric pressure, the pressure in the chamber 81, which is substantially the same as cabin pressure, acting on the diaphragm 71 and cover 58, will effect closing of the valve. Also, when cabin pressure exceeds atmospheric pressure, the diaphragm 50 will be moved back to its original position on the baffle, as shown in Fig. 3, due to the entrance of cabin air pressure through the openings 64 in the cover.

Dump valve operation

Pneumatic operation of the present valve in its dump function is effected by manual control applied to the pump valve 117. In normal flight, as has been pointed out hereinabove, valve 117 is closed. When the pilot wishes to equalize cabin and ambient atmospheric pressures, he merely opens the valve 117, which is located conveniently near him. This results in a rapid equalization of the pressure in chamber 81 with that of the ambient atmosphere. As ambient atmospheric pressure now prevails in the chamber 81, the operation of the mechanism is substantially the same as that described in connection with the positive pressure relief.

It will be apparent that the dumping function may also be effected mechanically by the application of a mechanical force to the outflow valve assembly, and this force may be applied by any suitable means such as a positioning jack manually, or by electrically operated apparatus.

Figure 7:
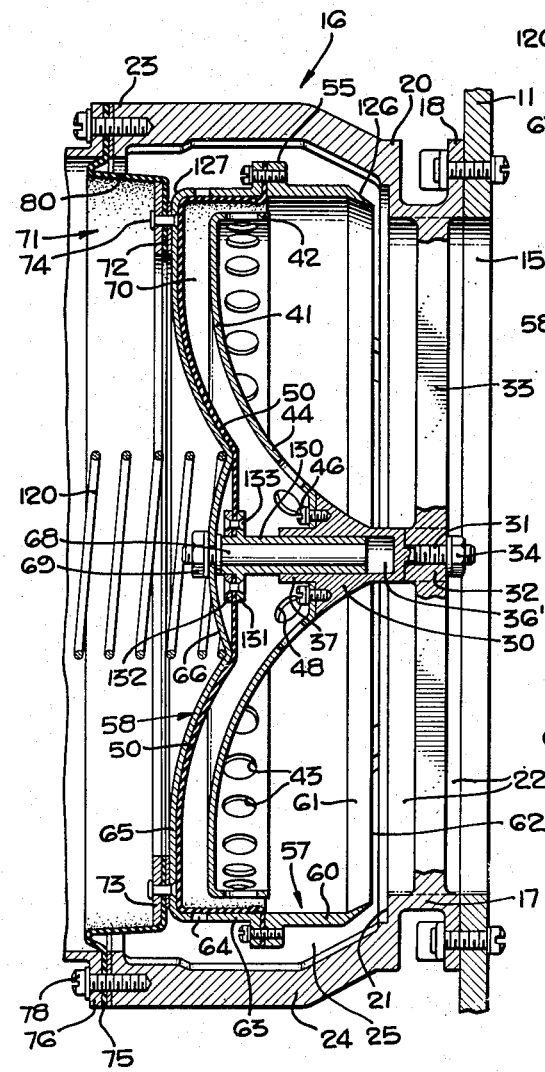
Fig. 7 shows an alternative arrangement of a pressure control relief mechanism embodying the present arrangement.

Referring to Fig. 7, which is an alternative arrangement, the diaphragm 50 is centrally connected to a movable tubular member 130, slidable in the bore 36' of the pedestal 30. A central area of the diaphragm is clamped between an external flange 131 of the member 130 and a ring 132 which is secured by rivets 133. Shaft 68 is slidably received within the tubular member 130, and it will be apparent that when the diaphragm 50 engages the bottom wall of the cover 58, the tubular member 130 also moves to the left, as shown in Fig. 7, and the end adjacent the bottom wall of the cover 58 engages said wall so that the atmospheric pressure exerted on the diaphragm 50 is effective over substantially the entire area of said diaphragm for effecting opening movement of the outflow valve.

The present arrangement is such that there is an extremely quick response to pressure variations of the character which will effect operation of the mechanism.

I claim:

1. A relief valve for mounting internally of a pressurized enclosure and in communication with an opening in a wall thereof, comprising: a valve body having a valve seat about said opening; a control chamber having a restricted inlet communicating with said enclosure and a pair of outlets communicating with ambient atmosphere; a calibrated valve controlling one of said outlets, said valve being subjected on one side to said ambient atmosphere and on the other side to the pressure in said chamber and openable when ambient pressure drops to a predetermined differential value with respect to pressure in said chamber; a manual valve controlling the other outlet; a check valve for said other outlet; movable pressure sensitive means including a valve assembly comprising a shallow cup-shaped cover having an end wall and an axial flange having a plurality of annularly spaced openings therein, and a cylindrical valve member connected to the flange of said cover and extending toward said valve seat, the free end of said valve member being engageable with said seat; a flexible member connecting the movable pressure sensitive means with the valve body, said flexible member and pressure sensitive means being subjected on one side to the pressure in the control chamber, the other side of said flexible member and end wall of the valve cover being subjected to enclosure pressure when said pressure is higher than that of said region, said enclosure pressure being transmitted through the openings in the flange of said cover; a fixed baffle within the space defined by the cover and valve member, said baffle having an axial flange provided with a plurality of spaced openings therein; and a flexible member connected centrally to said baffle and peripherally to said valve element, one side of said flexible member being subjected to the pressure in said enclosure when said pressure is higher than atmospheric pressure and the other side being subjected to atmospheric pressure through the openings in said baffle flange, said flexible member having an intermediate portion movable from a position engaging the baffle and baffle flange to a position whereat it engages the wall of said cover when atmospheric pressure is higher than the pressure in the enclosure, the last mentioned flexible means and valve member having opposed surfaces of substantially equal areas exposed to atmospheric pressure so that the force thereof exerted against said surfaces produces substantially no effective influence in a direction tending to open or close the valve.

2. In flow control mechanism: a valve body having a valve opening with a seat about said opening; a control chamber having a calibrated restricted inlet for communication with a source of higher pressure and a pair of outlets adapted to communicate with a region of lower variable pressure; a calibrated valve controlling one of said outlets, said valve being subjected on one side to the pressure of said region and on the other side to the pressure in said chamber and openable when the pressure of said region drops to a predetermined differential value with respect to the pressure of said chamber; a manual valve controlling the other outlet; a check valve for said other outlet; movable pressure sensitive means including a valve assembly comprising a shallow cup-shaped cover having an end wall and an axial flange having a plurality of annularly spaced openings therein, and a cylindrical valve member connected to the flange of said cover and extending toward the valve seat, the free end of said valve member being engageable with said seat; a flexible member connecting the movable pressure sensitive means with the valve body, said flexible member and pressure sensitive means being subjected on one side to the pressure in the control chamber, the other side of said flexible member and end wall of the cover being adapted to be subjected to a pressure to be controlled when said pressure is higher than that of said region, the pressure to be controlled being transmitted through the openings in the flange of said cover; a fixed baffle within the space defined by the cover and valve member, said baffle having an axial flange provided with a plurality of annularly spaced openings therein; a flexible member connecting said baffle and valve element, one side of said flexible member being adapted to be subjected to the pressure to be controlled when said pressure is higher than that of said region and the other side being adapted to be subjected to the pressure of said region of lower pressure transmitted through the openings in said baffle flange, said flexible member being movable from a position engaging the baffle to a position whereat it engages the wall of said cover when the pressure of said region is higher than the pressure to be controlled.

3. In a pressure relief valve for a pressurized enclosure, comprising: a valve body having a valve opening with a seat about said opening; a control chamber having an inlet communicating with said enclosure; means for relieving the pressure in said control chamber; movable pressure sensitive means including a valve assembly comprising a cover having an end wall and a valve member extending toward the valve seat and adapted to engage said seat; a flexible member connecting the movable pressure sensitive means with the valve body, said flexible member and pressure sensitive means being subjected on one side to the pressure in the control chamber, the other side of said flexible member and wall being subjected to enclosure pressure; a fixed baffle spaced from said wall; and a flexible member connecting said baffle and valve member, one side of said flexible member being subjected to enclosure pressure and the other side being subjected to ambient atmospheric pressure.

4. The invention defined by claim 3, wherein the means for relieving the pressure in said enclosure comprises manually operable means.

5. The invention defined by claim 3, wherein the means for relieving the pressure in said enclosure comprises pressure responsive pilot valve means openable when ambient pressure is exceeded by the pressure in the control chamber by a predetermined amount.

6. The invention defined by claim 3, wherein means for relieving the pressure in the control chamber comprises manually operable means; and a check valve preventing pressure from entering the control chamber by way of said manually operable means.

7. In a pressure relief valve for a pressurized enclosure, comprising: a valve body having a valve opening with a seat about said opening; a control chamber having an inlet communicating with said enclosure; movable pressure sensitive means including a valve assembly comprising a cover having an end wall and a valve member extending toward the valve seat and adapted to engage said seat; a flexible member connecting the movable pressure sensitive means with the valve body, said flexible member and pressure sensitive means being subjected on one side to the pressure in the control chamber, the other side of said flexible member and wall being subjected to enclosure pressure; a fixed baffle spaced from said wall; and a flexible member connecting said baffle and valve member and having a portion movable between a position engaging said baffle and a position engaging the end wall of said cover, one side of said portion of said flexible member being subjected to enclosure pressure and the other side being subjected to ambient atmospheric pressure.

8. A pressure relief valve for a pressurized enclosure having an opening communicating with ambient atmospheric pressure, comprising: a chamber; pressure sensitive means, including a movable flow valve member having a wall, said flow valve member controlling communication through said opening, said pressure sensitive means being subjected on one side to the pressure in said chamber; a fixed wall spaced from the valve wall; and a flexible element connecting said fixed wall and said pressure sensitive means and having a portion movable between said walls, one side of said flexible element being subjected to ambient atmospheric pressure, the other side of said flexible element being subjected to enclosure pressure when the latter is higher than ambient atmospheric pressure.

9. A pressure relief valve for a pressurized enclosure having an opening communicating with ambient atmospheric pressure, comprising: a chamber; pressure sensitive means, including a movable flow valve member having a wall, said flow valve member controlling communication through said opening, said pressure sensitive means being subjected on one side of the pressure in said chamber; a fixed wall spaced from the valve wall; and a flexible element having a central portion connected to the fixed wall and peripherally connected to the pressure sensitive means, said flexible element having an intermediate portion movable between said walls, one side of said flexible element being subjected to ambient atmospheric pressure and the other side of said flexible element being subjected to enclosure pressure when the latter is higher than ambient atmospheric pressure.

10. The invention defined by claim 8, including means for relieving the pressure in said chamber.

11. The invention defined by claim 8, including differential pressure responsive means for relieving the pressure in said chamber openable when the differential of pressure between that in the control chamber and ambient atmosphere reaches a predetermined value.

12. The invention defined by claim 8, including manually operable means for relieving the pressure in said chamber.

13. The invention defined by claim 8, including pilot valve relief means responsive to the differential of pressure between that in the control chamber and ambient atmospheric pressure when said differential reaches a predetermined value, and manually operable means for relieving the pressure in said chamber.

14. A pressure relief valve for a pressurized enclosure having an opening communicating with ambient atmospheric pressure, comprising: a chamber; pressure sensitive means, including a movable flow valve member having a wall, said flow valve member controlling communication through said opening, said pressure sensitive means being subjected on one side to the pressure in said chamber; a fixed wall spaced from the valve wall; a part axially arranged with respect to said fixed wall and axially slidable; and a flexible element having a central portion secured to said part and peripherally connected with said pressure sensitive means, said flexible element having an intermediate portion movable between said walls, said part being moved with movements of said flexible element, one side of said flexible element being subjected to pressure outside of said enclosure, the other side of said flexible element being subjected to enclosure pressure when the latter is higher than ambient atmospheric pressure.

15. In flow control mechanism for an enclosure having an opening and a valve seat thereabout: a movable valve member comprising a wall from which a flange extends toward said valve seat, the free end of said flange being adapted to engage said seat about said opening; wall means cooperating with said flange to form a pocket exposed to the exterior of said enclosure through said opening thereof, said wall means being spaced from the wall of said valve member and having openings therein; and flexible means between said wall means and said valve wall and connecting said wall means and said flange, said flexible means and said flange having opposed surfaces exposed to the pressure in said pocket so that the pocket pressure exerted in said surfaces produces substantially no effective influence in a direction tending to open or close said valve member, other portions of said flexible member being movable between a position engaging said wall means and a position engaging the wall of said valve.

16. A fluid valve including: wall means defining a pressure chamber; a valve seat; a pressure responsive element including a valve having an end wall, said valve projecting toward said seat, one side of said pressure responsive element being exposed to the interior of said pressure chamber; a member supported centrally of said valve in spaced relation to said end wall; and flexible sealing means connecting said central member and said pressure responsive element, said flexible sealing means including a portion movable between said member and said end wall.

17. In a pressure relief valve for a pressurized enclosure, including: a valve body having a valve seat defining an opening; a control chamber having an inlet; movable pressure sensitive means including a valve assembly comprising a cover having an end wall and a valve member extending toward the valve seat and adapted to engage said seat; a flexible member connecting the movable pressure sensitive means with the valve body, said flexible member and pressure sensitive means being subjected on one side to the pressure in the control chamber, the other side of said flexible member and wall being subjected to enclosure pressure; a fixed baffle spaced from said wall; and a flexible member connecting said baffle and valve member and having a portion movable between a position engaging said baffle and a position engaging the end wall of said cover, one side of said portion of said flexible member being subjected to enclosure pressure and the other side being subjected to ambient atmospheric pressure.

18. A pressure relief valve for a pressurized enclosure, including: a chamber; pressure sensitive means, including a movable flow valve member having a wall, said flow valve member controlling fluid through said relief valve, said pressure sensitive means being subjected on one side to the pressure in said chamber; a fixed wall spaced from the valve wall; and a flexible element connecting said fixed wall and said pressure sensitive means and having a portion movable between said walls, one side of said flexible element being subjected to ambient atmospheric pressure, the other side of said flexible element being subjected to enclosure pressure when the latter is higher than ambient atmospheric pressure.

19. A pressure relief valve for a pressurized enclosure having an opening, comprising: walls defining a control pressure chamber; pressure sensitive means, including a movable flow valve member having a wall, said flow valve member controlling communication through said opening, said pressure sensitive means being subjected on one side to the pressure in said chamber; a fixed wall spaced from the valve wall; and a flexible element having a central portion connected to the fixed wall and peripherally connected to the pressure sensitive means, said flexible element having an intermediate portion movable between said walls, one side of said flexible element being subjected to ambient atmospheric pressure and the other side of said flexible element being subjected to enclosure pressure when the latter is higher than ambient atmospheric pressure.

20. A fluid valve, including: a valve seat; a movable valve element cooperating with said seat and including a valve wall; a fixed wall spaced from the valve wall; a part axially arranged with respect to said fixed wall and axially slidable; and a flexible element having a central portion secured to said part and peripherally connected with said movable valve element, said flexible element having an intermediate portion movable between said walls, said part being moved with movements of said flexible element.

21. A fluid valve, including: a valve seat defining an opening; a movable valve element cooperable with said seat and including a wall part; a baffle member in spaced relation to said wall part and disposed between said wall part and said valve seat; and a flexible element between said baffle member and wall part and connecting same together, said flexible element having a portion thereof movable between a position engaging said baffle member and a position engaging said wall part.

22. A fluid valve comprising: a pressure chamber; a valve seat; a pressure responsive element including a valve having an end wall, said valve projecting toward said seat, one side of said pressure responsive element being exposed to the interior of said pressure chamber; a member supported centrally of said valve in spaced relation to said end wall; and flexible sealing means connecting said central member and said pressure responsive element, said flexible sealing means including a portion movable between and engageable respectively with said member and said end wall.

23. In combination in a single poppet balanced valve: a valve seat; a central member supported in spaced relation to said seat; a valve member cooperating with said central member to form a pocket adjacent to said seat and having a closed end wall spaced from said central member; and a flexible member connecting said central member and said valve member, said flexible member having a portion movable between and engageable with said central member and said end wall.

24. In a fluid valve: a valve seat; a movable valve element cooperable with said seat and including a wall part; a fixed member between said valve seat and said wall part, said fixed member being in spaced relation to said seat and wall part; a flexible element between said fixed member and wall part connecting same together, said flexible element having a portion thereof movable between a position engaging said fixed member and a position engaging said wall part.

25. In a single poppet balanced valve: a valve seat; a central member; means supporting said central member in spaced relation to said seat; a movable valve member cooperating with said valve seat and also cooperating with said central member to form a pocket adjacent to said seat and having the closed end wall spaced from said central member on the side thereof opposite the seat; and a flexible member connecting said central member and said valve member, said flexible member having a portion movable between said central member and said end wall.

RAYMOND W. JENSEN.

References Cited in the file of this patent

UNITED STATES PATENTS

| Number | Name | Date |
|---|---|---|
| 2,436,183 | Snedecor | Feb. 17, 1948 |
| 2,441,088 | Teague | May 4, 1948 |
| 2,531,100 | Arthur et al. | Nov. 21, 1950 |
| 2,641,985 | Jensen | June 16, 1953 |
| 2,641,986 | Arthur | June 16, 1953 |
| 2,651,985 | Warstler | Sept. 15, 1953 |